United States Patent [19]

Ogawa

[11] Patent Number: 5,377,399

[45] Date of Patent: Jan. 3, 1995

[54] METHOD AND APPARATUS FOR DISASSEMBLING AND REASSEMBLING AN ARTICLE

[75] Inventor: Masazumi Ogawa, Kanagawa, Japan

[73] Assignee: Fuji Photo Film Co., Ltd., Kanagawa, Japan

[21] Appl. No.: 145,642

[22] Filed: Nov. 4, 1993

[30] Foreign Application Priority Data

Nov. 4, 1992 [JP] Japan .................. 4-295443

[51] Int. Cl.⁶ .......................................... B23Q 17/00
[52] U.S. Cl. ................................ 29/407; 29/426.2; 29/426.3; 29/430; 29/705; 29/783; 29/784; 29/791
[58] Field of Search ............. 29/401.1, 402.01, 402.03, 29/402.08, 403.1, 403.3, 426.1, 426.2, 426.3, 430, 407, 705, 771, 783, 784, 786, 791, 793, 794, 799, 806, 822; 414/222; 198/346.1, 346.2, 465.1, 465.2; 264/36, 37

[56] References Cited

U.S. PATENT DOCUMENTS

| | | | |
|---|---|---|---|
| 2,757,447 | 8/1956 | Barenyi | 29/430 |
| 3,453,150 | 7/1969 | Murph et al. | 29/403.3 |
| 4,037,302 | 7/1977 | Hollander | 29/426.3 |
| 4,464,830 | 8/1984 | Carlsson | 29/403.3 |
| 4,722,653 | 2/1988 | Williams et al. | 29/791 |
| 4,905,363 | 3/1990 | Boyenval | 29/426.1 |
| 5,021,811 | 6/1991 | Maurinus et al. | |
| 5,126,775 | 6/1992 | Nakai et al. | 354/288 |
| 5,199,148 | 4/1993 | Colognori | 29/403.1 |
| 5,274,896 | 1/1994 | Saltin | 29/403.1 |

FOREIGN PATENT DOCUMENTS

| | | |
|---|---|---|
| 0465897 | 6/1991 | European Pat. Off. . |
| 3243930 | 10/1991 | Japan . |
| 4177230 | 6/1992 | Japan . |

OTHER PUBLICATIONS

Patents Abstracts of Japan, P-1434, Oct. 12, 1992, vol. 16, No. 491, 4177230, "Film Unit With Lens".
Patents Abstracts of Japan, P-1304, Jan. 28, 1992, vol. 16, No. 35, 3243930, "Film Integrated Type Camera".

Primary Examiner—Mark Rosenbaum
Assistant Examiner—David P. Bryant
Attorney, Agent, or Firm—Sughrue, Mion, Zinn, Macpeak & Seas

[57] ABSTRACT

A pair of conveyor lines are provided: one for disassembling a used article sequentially at a plurality of disassembling stations and the other for assembling a new identical article sequentially at a plurality of assembling stations. The disassembling stations are connected to assembling stations in one-to-one relation through a conveyor each. A reusable part of the used article which has been recovered at one of the disassembling stations is transferred by the conveyor to the corresponding assembling station for reuse in the new article, after taking necessary inspection. The conveying directions of these conveyor lines are reverse to each other.

15 Claims, 3 Drawing Sheets

METHOD AND APPARATUS FOR DISASSEMBLING AND REASSEMBLING AN ARTICLE

BACKGROUND OF THE INVENTION

1. Field of the Invention

The present invention relates to a method of disassembling a used article so as to recover reusable parts therefrom, and reassembling the reusable parts into the same article, adding new parts in place of unusable parts of the used article. The present invention also relates to a disassembling and reassembling apparatus for the method.

2. Related Art

In the interest of environmental protection, the modern trend in the industry is toward recycling articles. For example, lens-fitted photographic film packages, which are manufactured by Fiji Photo Film Co., Ltd., are recovered, disassembled and inspected by the manufacturer, to be reused in new lens-fitted photographic film packages (hereinafter referred to as film packages).

The film package is constituted of a compact plastic resin package body having simple exposure mechanisms incorporated therein and containing photographic film therein. The package body cannot be repeatedly loaded with film. After exposure of all available frames of the contained film, the whole film package is forwarded to a photofinishing laboratory through an agency. In the photofinishing laboratory, the exposed film, which has already been wound in a light-tight container in the package body, is removed for developing and printing. The emptied package body is collected and disassembled by the manufacturer, so as to sort out reusable parts thereof. The reusable parts are reserved for each sort of parts after necessary inspections. Then, the reusable parts are supplied to an automatic assembling line for assembling film packages. Such a film package that takes into account reuse of the parts is disclosed, for example, in JPA 4-177230. Also JPA 3-243930 and U.S Pat. No. 5,021,811 disclose single-use cameras with film preloaded therein which are designed for recycling.

Because the film package does not require cumbersome loading and unloading of the film, nor complicated operation, the film package enables anyone to enjoy photography with ease. Besides, in order to make the price of the film package comparable to the price of ISO 135 type photographic film or the like, and to allow anyone to buy the film package, economizing of the film package has been thoroughly pursued.

On the other hand, recycling requires a great deal of operations such as disassembling of articles, sorting of parts, inspection of the parts, and so forth. Because these operations have been carried out mainly by hand, the cost of recycling is rather high when compared with the cost of manufacturing anew, on the account of personnel expenses. Furthermore, according to the conventional recycling system, a large scale depot for reserving the recovered parts and a transport system for supplying these parts to the assembling line are necessary. Therefore, a system for controlling and managing the stock-and-running of the recovered parts is also necessary.

Another factor that increases the cost of recycling is that the time required from the recovery to the reassembling of the reusable parts in the conventional recycling system is too long.

SUMMARY OF THE INVENTION

In view of the foregoing, an object of the present invention is to rationalize the operations necessary for reusing parts of the used article.

Another object of the present invention is to minimize the time lag between recovery and reassembling of the reusable parts, so as to minimize the cost of reuse.

To achieve the above objects, the present invention provides a pair of conveyor lines: one for disassembling a used article sequentially at a plurality of disassembling stations and the other for newly assembling the same article sequentially at a plurality of assembling stations. At least one of the disassembling stations is connected through a conveyor to a corresponding one of the assembling stations, where a reusable part of the used article, which has been recovered at that disassembling station and conveyed by the conveyor, is assembled.

Because the reusable part recovered at the disassembling station is directly sent to the assembling station for assembling that part, the time lag between recovery and reassembling of reusable part is minimized. Also, the recycling system of the invention does not require a large scale depot or a large scale supply system for the recovered parts. Therefore, it is possible to reassemble the article at a low cost.

According to a preferred embodiment of the invention, the conveying direction of the one conveyor line is reverse to the other. Thereby, it is possible to minimize the distance between the corresponding disassembling and assembling stations.

According to another preferred embodiment, a trailing end of the disassembling line and a leading end of the assembling line are connected to form a continuous conveyor line. Thereby, a depot for reserving the most basic reusable part can be omitted.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

Figure 1:
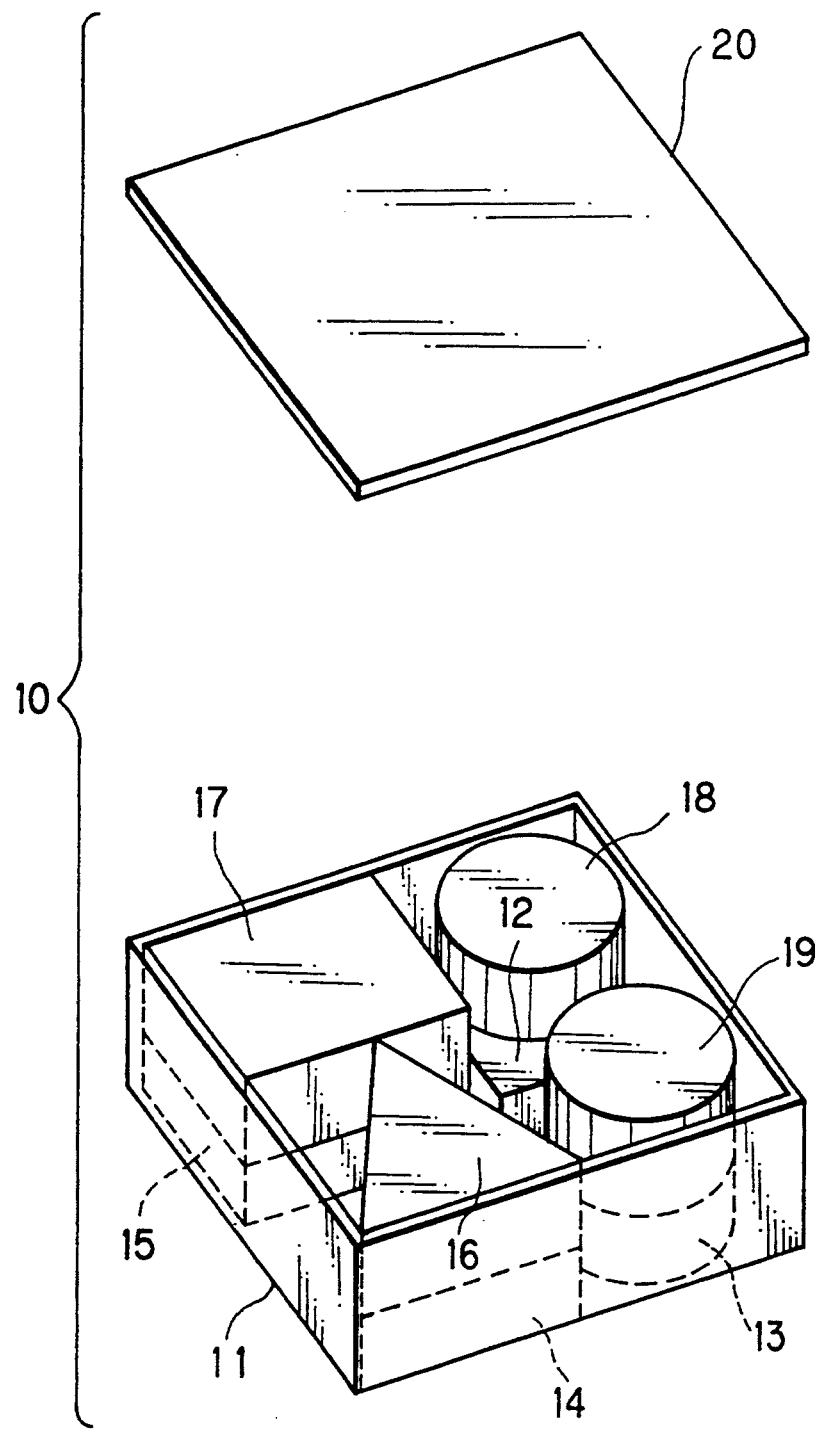
FIG. 1 schematically shows an example of an article to be disassembled and reassembled according to a preferred embodiment of the method of the invention.

FIG. 1 shows an example of article 10 to be disassembled and reassembled. The article 10 is constituted of a main body 11 having eight parts 12 to 19 incorporated therein and a lid 20 closing the main body 11.

Figure 2:
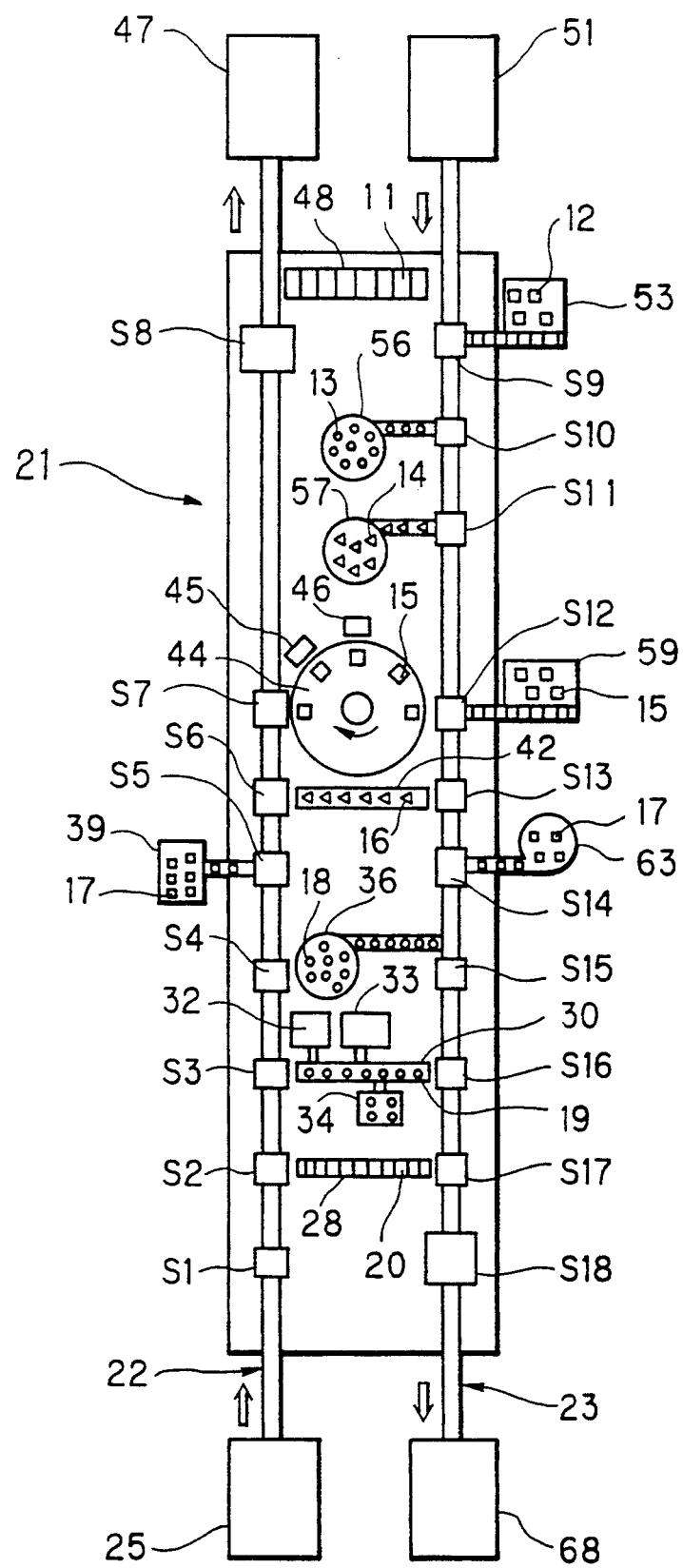
FIG. 2 schematically shows an overall construction of a disassembling and reassembling apparatus according to a preferred embodiment of the invention.

In FIG. 2 showing a disassembling and reassembling apparatus 21, a disassembling line 22 and an assembling line 23 are arranged in parallel to each other. The article 10, which has been recovered from the market, is fed from a feeder 25 to the disassembling line 22. The recovered article 10 may be subjected to a necessary inspection before it is loaded in the feeder 25, though such an inspection process is omitted in this embodiment.

In the first station S1 of the disassembling line 22, the article 10 is subjected to a preliminary treatment for enabling the lid 20 to be separated from the main body 20. For instance, screws are loosened and removed. Thereafter, the article 10 is conveyed to a second station S2. There are several types of conveyors such as a pallet type conveyor and a direct conveyor such as a rod type conveyor wherein articles are moved by being directly pushed with a rod. In the embodiment shogun in FIG. 2, the direct conveyor is adopted.

In the second station S2, the lid 20 is removed from the main body 11 and placed onto a parts transfer device 28 by means of a pick-and-place unit, hereinafter called simply as P&P unit, though the P&P unit is not shown for clarity. The parts transfer device 28 transfers the removed lid 20 to the assembling line. The parts transfer device may be selected in accordance with the shape of the parts as well as the necessary functions. For example, the parts transfer device may be a pitch advance type conveyor, a rectilinear type vibrating feeder, a belt conveyor or the like.

When the main body 11 is conveyed from the second station S2 to the third station S3, the part 19 is removed from the main body 11 and placed onto a parts transfer device 30. Assuming that total visual inspection of the part 19 is necessary in view of the function of the article 10, a visual inspector 32 is provided in correspondence with the parts transfer device 30 so as to determine whether the part 19 is reusable or not every time the part 19 is placed on the parts transfer device 30. If the part 19 is not determined to be reusable, the part 19 is ejected out of the lines by a rejected part ejector 33. In order to compensate for the ejected part 19, a feeder 34 replenishes the parts transfer device 30 with a new part 19.

It is to be noted that a new part is replenished each time a corresponding recovered part is ejected, assuming that the conveying speed of the assembling line 23 is substantially equal to that of the disassembling line 22. If the speed of the assembling line 23 is less than that of the disassembling line 22, a number of new parts are replenished depending on the number of corresponding recovered and reserved parts.

When the main body 11 is conveyed from the third station S3 to the fourth station S4, the part 18 is removed from the main body 11. The part 18 is transferred from the main body 11 directly to a bowl of a bowl type feeder by means of a not-shown P&P unit.

When the main body 11 is conveyed from the fourth station S4 to the fifth station S5, the part 17 is removed from the main body 11. The part 17 is always ejected from the lines to a depot 39 by a not-shown P&P unit, assuming that the part 17 is not reusable as it is since the part 17 has great influence on the reliability of the article 10.

When the main body 11 is conveyed from the fifth station S5 to the sixth station S6, the part 16 is removed from the main body 11. The part 16 is transferred to the assembling line 23 through a parts transfer device 42 in the same way as the parts transfer device 28.

At the seventh station S7, the part 15 is removed from the main body 11. The part 17 is, for instance, a unit constituted of a plurality of elements and having an independent function. Therefore, the part 15 is subjected to an examination process for confirming that the independent function is effective, before the part 15 is reassembled into the main body 11. For the examination process, a not-shown P&P unit transfers the part 15 from the station S7 to an index table 44, wherein a function examiner 45 examines the part 15 upon its function. If necessary, a plurality of function examiners may be provided for this purpose. If the function examiner 45 determines the part 15 as defective, the part 15 is ejected by an ejector 46 in a station of the index table 44.

In this example, only the parts 19, 18, 16 and 15 are supposed to be substantially reusable, but the remaining parts 17, 14, 13 and 12 are not supposed to be reusable. Therefore, in the eighth station S8, the main body 11 is subjected to an inspection for confirming that the necessary parts have been removed therefrom. Then, the remaining parts 12 to 14 are ejected out of the lines at the station S8. Thereafter, the main body 11 is reserved in a depot 47. Simultaneously, it is determined whether the main body 11 is reusable or not, and the reusable main body 11 is transferred to the assembling line 23 through a conveyer 48.

On the assembling line 23, a new main body 11 is supplied from a feeder 51 to the line 23. Instead of the new main body 11, the reusable main body 11 that has been recovered at the station S8, may be fed to the assembling line 23. In either case, the main body 11 is mounted with the part 12 at a station S9. The part 12 is supplied from a magazine type feeder 53, and mounted in the main body 11 by means of a not-shown P&P unit.

At subsequent stations S10 and S11, the parts 13 and 14 are supplied from bowl type feeders 56 and 57, respectively, to be sequentially mounted in the main body 11 by means of not-shown P&P units. At a station S12, the part 15 which has been determined to be reusable by the function examiner 45, is mounted in the main body 11. Or otherwise, a new conforming part 15 is replenished by a magazine type feeder 59 so as to be mounted in the main body 11 at the station S12.

At a station S3, the main body 11 is mounted with the part 16 which has been recovered at the station S6 of the disassembling line 22 and transferred to the station S13 through the parts transfer device 42. At a station S14, a new part 17 is supplied from a bowl type feeder 63 and mounted in the main body 11. At a station S15, the part 18, which has been recovered at the station S4 and reserved in the bowl feeder 36, is mounted in the main body 11. At a station S16, the part 19, which has been recovered at the station S3 and determined non-defective by the visual inspector 32, is mounted in the main body 11. Instead of the recovered part 19, a new part 19 may be supplied from the feeder 34 and mounted in the main body 11.

At a station S17, the lid 20 recovered at the station S2 is secured to the main body 11 through screws or the like. For the screw connection, a screw feeder and a screw driver and so forth may be necessary, though these devices are omitted for clarity. Finally, an article that is identical to the article 10 is produced. The produced article is inspected at an inspection station S18 and thereafter stored in a depot 68.

Figure 3:
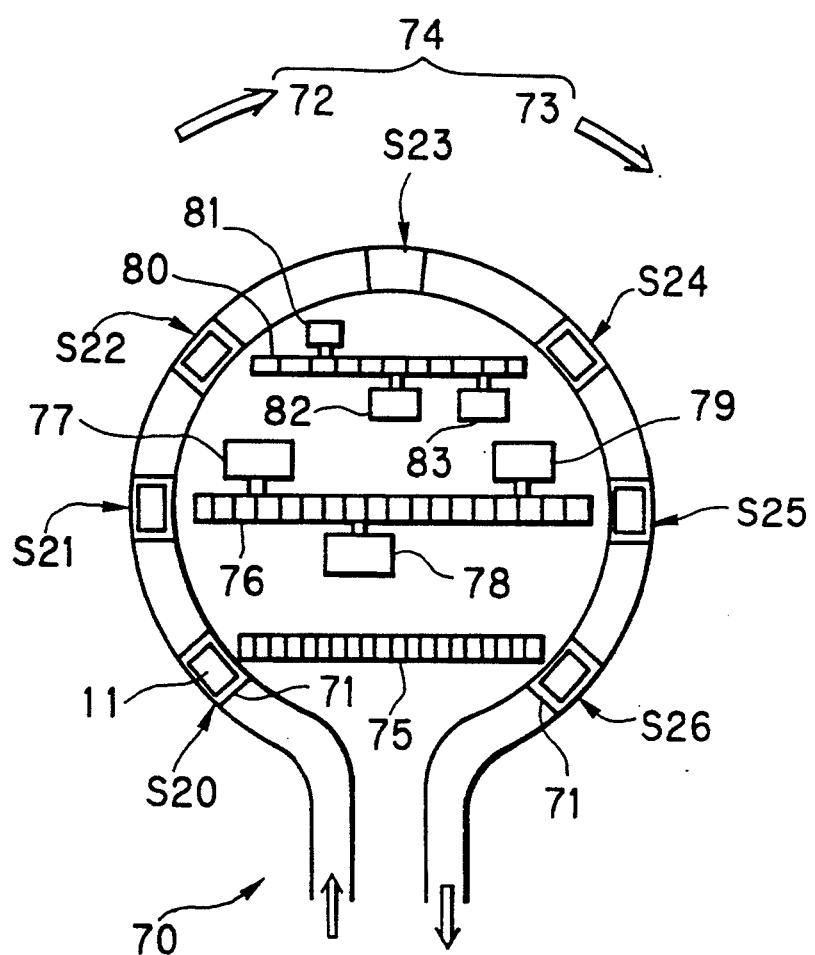
FIG. 3 schematically shows an overall construction of a disassembling and reassembling apparatus according to another preferred embodiment of the invention.

FIG. 3 shows a disassembling and reassembling apparatus 70 according to another embodiment of the invention, wherein a main body 11 is carried on a pallet 71. As for the pallet type conveyer, it is unnecessary to form disassembling and assembling lines 72 and 73 in a rectilinear fashion. Rather, a continuous conveying line 74 including these lines 72 and 73 connected to each other through a curved connection line, can be adopted so far as the main body 11 is supposed to be reusable. In this apparatus 70, the first station S20 of the disassembling line 72 and the last station S26 of the assembling line 73 are connected through a parts transfer device 75. The parts transfer device 75 sends a part recovered at the station S20 to the station S26.

A part removed from the main body 11 at the next station S21 of the disassembling line 72, is transferred to a corresponding station S25 of the assembling line 73 through a parts transfer device 76, while being inspected by an inspector 77 at that time. If the part is rejected by the inspector 77, the part is ejected by an ejector 78. A parts feeder 79 replenishes a new part so as to compensate for the ejected part, and the new part is sent to the station S25 through the parts transfer device 76.

A station S22 of the disassembling line 72 and a station S24 of the assembling line 73 are connected through a parts transfer device 80, and inspector 81, an ejector 82 and a parts feeder 83, in the same way as described with respect to the stations S21 and S25. A station S23 disposed between the lines 72 and 73 is a main body inspection station.

Although there are P&P units in the respective stations S20 to S26, the P&P units are not shown for clarity.

While the present invention has been described in detail with respect to the preferred embodiments shown in the drawings, the present invention should not be limited to the above-described embodiments, but on the contrary, various modifications may be possible within a scope of the appended claims.

What is claimed is:

1. A method of disassembling a used article and assembling a new article which has the same construction as said used article, by reusing at least one part of said used article, said method comprising the steps of:
   conveying said used article on a first line having a plurality of disassembling stations aligned thereon for sequentially disassembling said used article;
   removing a first part from said used article at a first one of said disassembling stations;
   transferring said first part from said first disassembling station directly to a corresponding assembling station through a transfer line, said corresponding assembling station being one of a plurality of assembling stations which are aligned on a second line for sequentially assembling said new article; and
   mounting said first part, if reusable, at said corresponding assembling station to other parts of said new article which have been assembled in preceding ones of the assembling stations.

2. A method as recited in claim 1, further comprising the steps of:
   determining whether said first part is reusable or not directly after said removing step, so as to transfer said first part to said corresponding assembling station if said first part is determined to be reusable.

3. A method as recited in claim 2, wherein said determining step is performed on said transfer line, said method further comprising the step of ejecting said first part out of said transfer line if said first part is not reusable.

4. A method as recited in claim 3, further comprising the step of supplying said corresponding assembling station with a new part which corresponds in kind to said first part, each time a first part from a corresponding used article is determined not to be reusable and is ejected.

5. A method as recited in claim 4, wherein the sequence of assembling on said second line is reverse to the sequence of disassembling on said first line.

6. A method as recited in claim 5, wherein said first and second lines are disposed in parallel to each other, and the conveying direction of said second line is reverse to that of said first line.

7. An apparatus for disassembling a used article and assembling a new article which has the same construction as said used article, by reusing at least one part of said used article, said apparatus comprising:
   a first conveyor line having a plurality of disassembling stations aligned thereon for sequentially disassembling said used article;
   a second conveyor line having a plurality of assembling stations aligned thereon for sequentially assembling said new article; and
   means for transferring a first part, which is removed from said used article at a first one of said disassembling stations, directly to a first one of said assembling stations so as to reuse said first part, if said first part is reusable, at said first assembling station.

8. An apparatus as recited in claim 7, further comprising:
   means for determining whether said first part is reusable or not, so as to transfer said first part to said first assembling station if said first part is determined to be reusable, said determining means being disposed proximate to said transferring means.

9. An apparatus as recited in claim 8, further comprising:
   means for ejecting said first part out of said transferring means if said first part is not reusable.

10. An apparatus as recited in claim 9, further comprising:
   means for supplying said first assembling station with a new part which corresponds in kind to said first part, each time a first part from a corresponding used article is determined not to be reusable and is ejected.

11. An apparatus as recited in claim 7, wherein the sequence of assembling on said second conveyor line is reverse to the sequence of disassembling on said first conveyor line.

12. An apparatus as recited in claim 11, wherein the conveying direction of said second conveyor line is reverse to the conveying direction of said first conveyor line.

13. An apparatus as recited in claim 12, wherein said first and second conveyor lines extend in parallel to each other.

14. An apparatus as recited in claim 7, wherein a trailing end of said first conveyor line and a leading end of said second conveyor line are connected to form a continuous conveyor line.

15. An apparatus as recited in claim 14, wherein said continuous conveyor line is a pallet type conveyor.

* * * * *